United States Patent
Loney

[19]

[11] Patent Number: 5,805,598
[45] Date of Patent: Sep. 8, 1998

[54] END STATION PORT

[75] Inventor: Mark Kenneth Loney, Herts, Great Britain

[73] Assignee: Madge Networks Limited, United Kingdom

[21] Appl. No.: 703,531

[22] Filed: Aug. 27, 1996

[30] Foreign Application Priority Data

Aug. 29, 1995 [GB] United Kingdom ............... 9517619

[51] Int. Cl.⁶ .......................... H04J 3/16; H04L 12/417; H04L 12/42
[52] U.S. Cl. .......................................... 370/452; 370/474
[58] Field of Search .................................. 370/258, 428, 370/429, 449, 450, 452, 470, 474, 476; 340/825.05

[56] References Cited

U.S. PATENT DOCUMENTS

| Re. 35,001 | 7/1995 | Grow | 340/825.05 |
| 4,454,508 | 6/1984 | Grow | 370/452 |
| 4,482,999 | 11/1984 | Janson et al. | 370/452 |
| 4,964,113 | 10/1990 | Geyer et al. | 370/85.5 |
| 5,003,533 | 3/1991 | Wantanabe | 370/258 |
| 5,247,517 | 9/1993 | Ross et al. | 370/85.5 |
| 5,465,254 | 11/1995 | Wilson et al. | 370/452 |

FOREIGN PATENT DOCUMENTS 0 430 050 A2  6/1991  European Pat. Off. .
0 625 838 A2  11/1994  European Pat. Off. .

OTHER PUBLICATIONS

PCT Search Report, Dec. 9, 1996.

Primary Examiner—Chi H. Pham
Assistant Examiner—Ricky Q. Ngo
Attorney, Agent, or Firm—Sughrue, Mion, Zinn, Macpeak & Seas, PLLC

[57] ABSTRACT

An end station port (2–6) for connection to a token passing communication system which connects a number of end station ports and in which the communications protocol under which the system operates permits more than one data frame to be transmitted by an end station within a predetermined token holding time comprises a transmit store/frame assembly unit (19) for preparing a data frame, having a length not exceeding a predetermined maximum size, for transmission; and control logic (20) for controlling the passage of data to and from the end station port for transmission on to and receipt from the communication system in use. The control logic (20) transmits a frame prepared by the frame assembly unit (19) when the token is held by the end station port. The control logic (20) includes a monitor (21) for determining whether, following transmission of a current frame, there is sufficient time remaining to transmit another frame of the predetermined maximum size before the predetermined token holding time has expired.

12 Claims, 2 Drawing Sheets

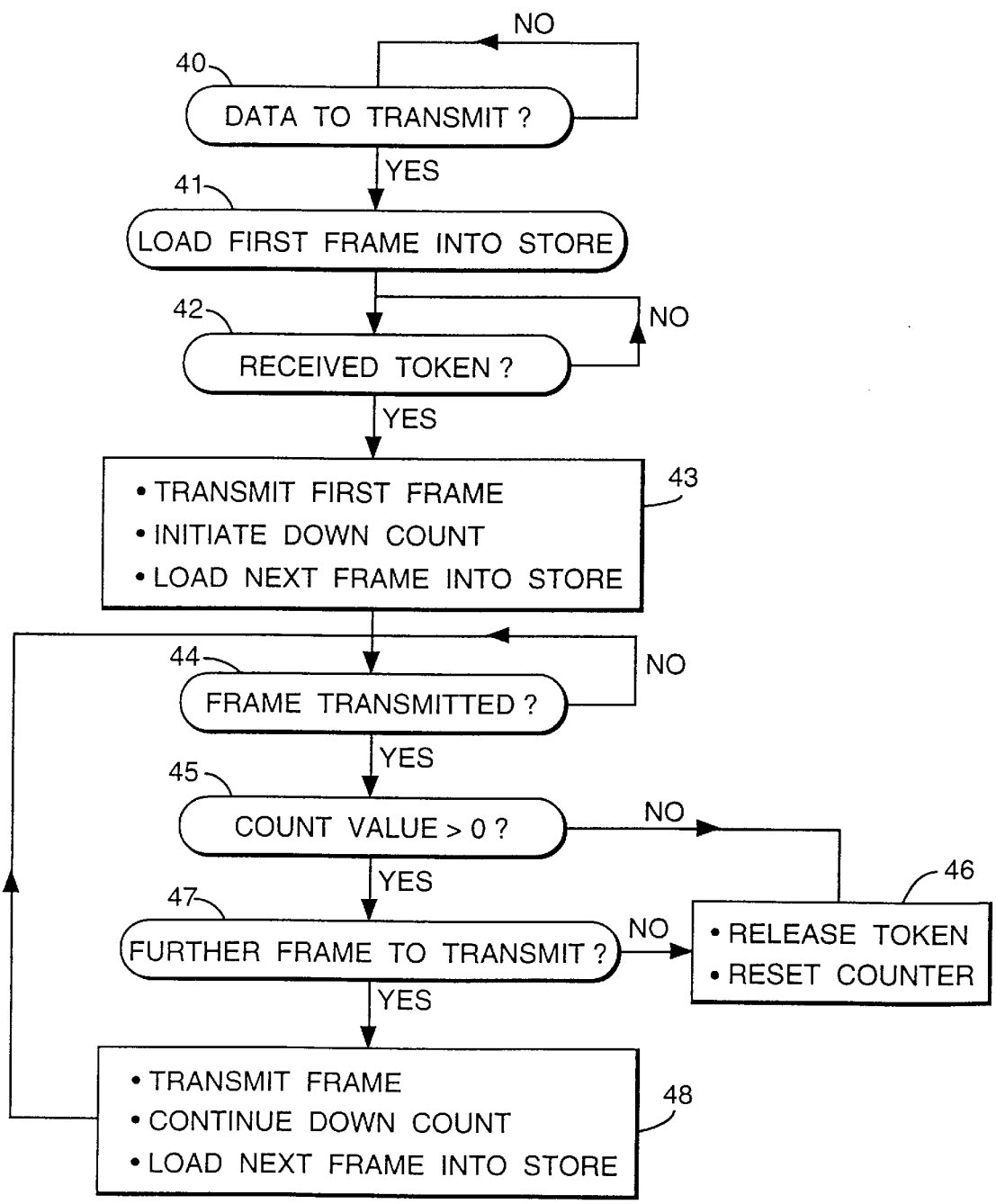

END STATION PORT

FIELD OF THE INVENTION

The invention relates to an end station port for connecting to a token passing communication system.

The invention also concerns a token passing communication system connecting a number of end station ports according to the invention.

BRIEF DESCRIPTION OF THE PRIOR ART

Token passing communication systems are well known and are used primarily for implementing local area networks (LANs) and the like. They can have various logical configurations including rings and buses but all operate on the basis of a protocol in which only an end station port holding a token is permitted to transmit data in the form of frames. Such end station ports can be coupled to communication equipment such as processors (e.g. PCs) or to a bridge unit linking the communication system with another communication system. A typical protocol is described in the IEEE 802.5 Standard. Conventionally, when an end station port holds the token, it is permitted under the protocol only to transmit a single frame of data and thereafter it must release the token to enable another end station port to transmit data. However, certain protocols permit an end station port holding the token to transmit more than one data frame while it holds the token providing an overall predetermined token holding time is not exceeded. The problem with operating such a protocol is how to determine how many frames of data can be transmitted within the predetermined token holding time in view of the fact that data frames do not have a fixed length. One approach would be to build up a set of data frames in memory prior to transmission and to ensure that the length of the multiple data frames were such that they could all be transmitted within the predetermined token holding time. However, this can add significantly to the overall processing and transmission time in view of the need to build up the data frames in memory prior to transmission.

SUMMARY OF THE INVENTION

In accordance with the present invention, an end station port for connecting to a token passing communication system which connects a number of end station ports and in which the communications protocol under which the system operates permits more than one data frame to be transmitted by an end station within a predetermined token holding time comprises frame assembly means for preparing a data frame, having a length not exceeding a predetermined maximum size, for transmission; control means for controlling the passage of data to and from the end station port for transmission on to and receipt from the communication system in use, wherein the control means transmits a frame prepared by the frame assembly means when the token is held by the end station port, and wherein the control means includes monitoring means for determining whether, following transmission of a current frame, there is sufficient time remaining to transmit another frame of the predetermined maximum size before the predetermined token holding time has expired.

We have devised a particularly simple approach which enables an end station port to transmit multiple data frames within a predetermined token holding time without having to build up the data frames initially in memory. This is primarily achieved by presetting a maximum frame size (usually less than the token holding time) for the end station port so that the control means "knows" that the next frame will not be larger than the predetermined maximum frame size. Consequently, by monitoring for example the remaining time left to transmit data frames within the predetermined token holding time, and providing this is greater than the predetermined maximum frame size, then another frame can be transmitted.

It should be understood that the token holding time and frame size are measured in similar units since frames are transmitted at a common, fixed rate.

Typically, the maximum frame size will be determined during initiation of the communication system incorporating the end station port by reference to other end station ports within the system.

The end station port could be connected to a data processor such as a PC or the like or it could constitute a bridge connecting the communication system to another communication system.

The communication system will typically be in the form of a local area network but other forms of network are also possible and the configuration of the communication system can be of any conventional type such as a ring or bus. The medium connecting the end station ports can again be of any conventional type including a hard wired connection, fibre optic, or a non-physical link.

In general, each end station port will be associated with its own frame assembly means and control means. However, in some cases, a frame assembly means and control means could be common to more than one end station port.

Within the communication system, it is possible that not all end station ports will have the ability to transmit multiple frames although the invention is concerned only with end station ports having that capability. In either event, all end station ports can receive data.

Typically, the frame assembly means will include a store for storing a whole data frame prior to transmission. In some cases, however, a data frame to be transmitted may be only partially stored or even generated "on the fly".

Conveniently, the monitoring means comprises a counter which is incremented or decremented at regular intervals to monitor the time to transmit a data frame, and comparison means for comparing the time remaining until completion of the current predetermined token holding time and the time to transmit a frame of the predetermined maximum size. Typically, the counter counts data bytes as they are transmitted.

In one example, the counter is a down counter which starts from a value equal to the predetermined token holding time less the time for completing the transmission of a data frame of predetermined maximum size. This means that the current count value can be compared with zero to determine whether or not there is sufficient time left to transmit a further frame. Alternatively, the counter could start from a value equal to the predetermined token holding time the current count value being compared with a count value representing the time to transmit a frame of the predetermined maximum size.

Typically, for a 16M bit Token Ring, the predetermined token holding time will correspond to the transmission of about 18K data bytes while the predetermined maximum frame size is for example 4K bytes. Of course, other values can be chosen depending on the capabilities of the end station ports within the communication system.

BRIEF DESCRIPTION OF THE DRAWINGS

An example of a token passing communication system including end station ports according to the invention will now be described with reference to the accompanying drawings, in which.

DETAILED DESCRIPTION OF THE EMBODIMENTS

Figure 1:
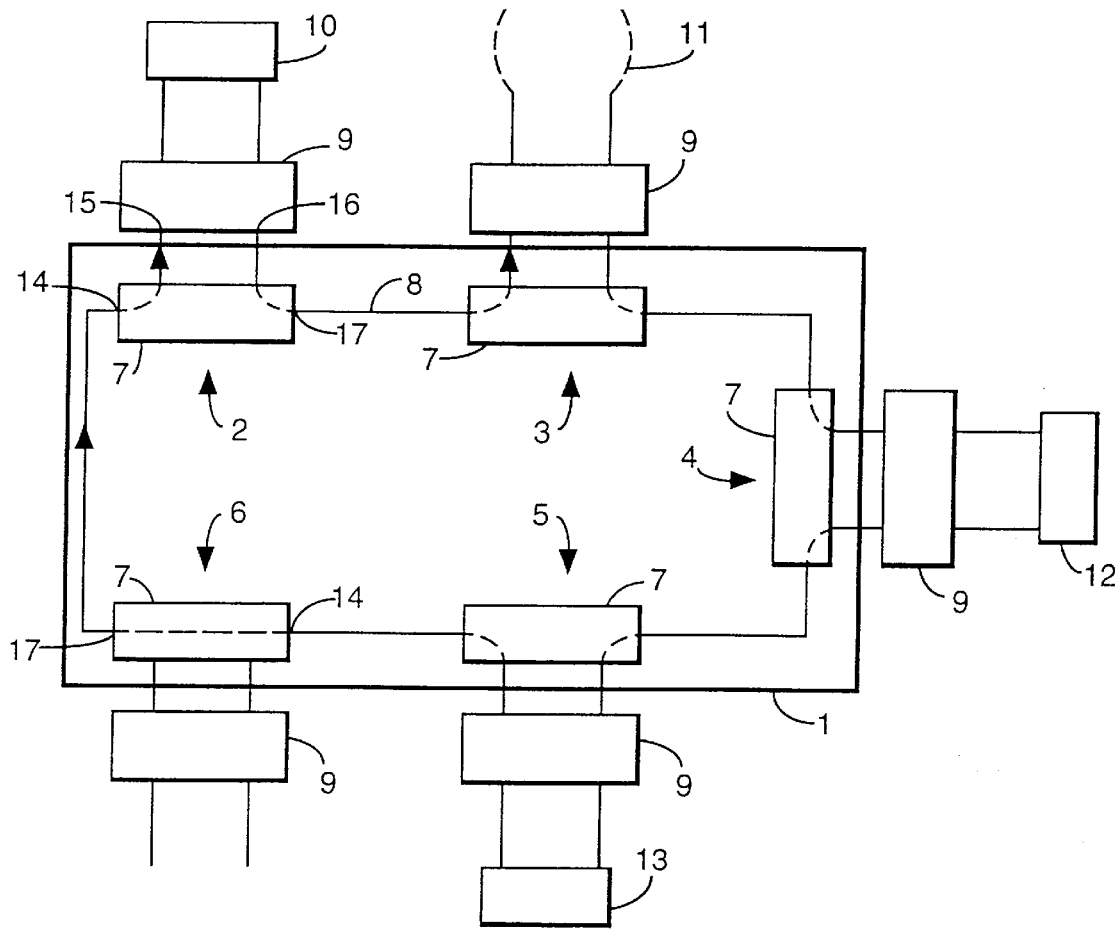
FIG. 1 is a schematic, block diagram of the communication system.

The communication system shown in FIG. 1 is a token passing ring and includes a hub unit 1 within which are mounted five end station ports 2–6. Each end station port includes a relay 7 connected to the ring 8. Each system which wishes to communicate via the ring, such as a PC, file server and the like, or another communication system, is connected to a respective end station port via a processing stage 9. In this example, the end station port 2 is connected to a PC 10, the end station port 3 is connected to another ring communication system shown schematically at 11, the end station port 4 is connected to a file server 12 and the end station port 5 is connected to a PC 13. The end station 6 is not connected to a processing system.

When the ring is initiated, control means (not shown) within the hub unit 1 controls operation of the relays 7 so that they take up the configuration shown in dotted lines in FIG. 1. Thus, for example, the relay 7 of the end station port 2 connects an input port 14 to an input port 15 of the processing unit 9 and connects an output port 16 of the unit 9 to an output port 17 connected to the ring 8. The relays 7 of the end station ports 3–5 are set similarly while the relay 7 of the end station port 6 connects the input port 14 directly to the output port 17 bypassing the processing unit 9. Thus, a closed ring communication system is set up which passes through all the processing stages 9 with which further processing means is connected.

In operation, a token is transmitted around the ring 8 and if an end station port has data to transmit to another end station port, it holds the token for up to a predetermined token holding time and during this time transmits a data frame including the data to the desired destination end station port. The destination port, on receiving the data frame and recognising its own address as the destination address contained in the frame, then copies the data while allowing the data frame to pass on around the ring until it returns to the source end station port where it is removed. Conventionally, the token is then released on to the ring to enable another end station port to transmit data. However, as will be explained below, the present invention is concerned with the ability to transmit more than one data frame while continuing to hold the token as permitted by the IEEE 802.5 Standard.

Figure 2:
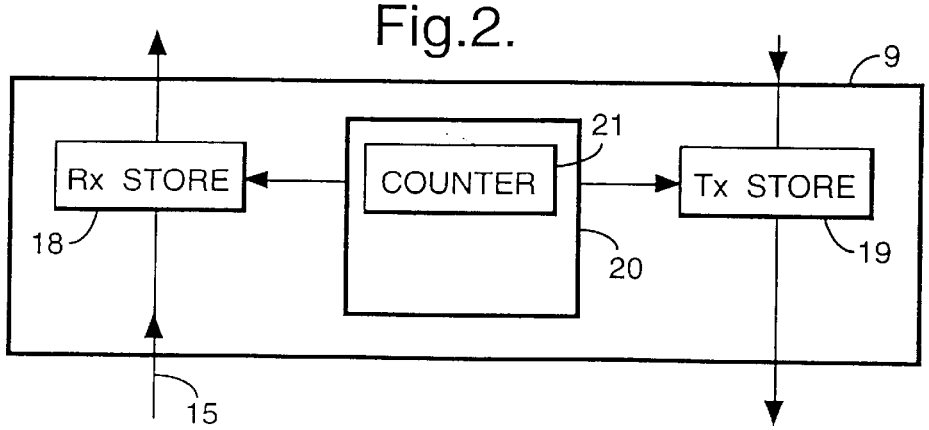
FIG. 2 is a block diagram of a processing stage of an end station port in more detail; and, FIG. 3 is a flow diagram illustrating operation of an end station port.

The processing stage 9 is shown in more detail in FIG. 2. As can be seen, the input port 15 is connected to a receive store 18 which can store an incoming frame (partially or fully) and which can be read by the associated processing device such as the PC 10. The stage 9 also has a transmit store frame assembly unit 19 in which a frame can be assembled for transmission on to the ring. Operation of the stores 18,19 is under the control of control logic 20 or a microprocessor (but preferably hard coded silicon) which includes a down counter 21.

An example of operation of the token passing communication system shown in FIG. 1 will now be described with reference to the flow diagram shown in FIG. 3. The flow diagram illustrates the operation of a typical end station and in this example it will be assumed that the end station port 2 wishes to transmit data to the end station port 4. The control logic 20 determines whether data is available to transmit (step 40). If it is, the control logic 20 causes the data to be assembled into a frame and stored in the transmit store 19 (step 41). Next, the control logic 20 monitors the ring 8 and determines when a token is received (step 42). Once the token has been received, the end station port 2 is free to transmit data frames onto the ring and in a step 43 the control logic 20 causes the first data frame in the transmit store 19 to be transmitted on to the ring. At the same time, the counter 21 commences its down count and, if further data is to be transmitted, a new frame is assembled in the transmit store 19.

It will be assumed here that the maximum time (token holding time) for which the token may be held is T (for example corresponding to the transmission of 18K data bytes) while the maximum size of a data frame is F (for example 4K bytes).

The down count initiated in step 43 commences from a value of T-F. It will be appreciated that this initial value is thus set as if a maximum length frame has been transmitted. The down count is decremented by one for each byte which is transmitted.

The control logic 20 monitors for the completion of transmission of a frame (step 44) and once the frame has been transmitted it then compares the current count value C with zero. If C>0 then there is time to transmit at least one more frame even if that frame has the maximum permitted size F (step 45). If C<0 then it is unsafe to attempt to transmit a further frame since this may exceed the remaining available time and as a result the token is released and the counter reset (step 46).

If C>0, a further frame can be transmitted and the control logic 20 determines whether in fact there is a further frame to transmit (step 47). If there is not then again processing returns to step 46. However, if a further frame is available, then the frame is transmitted, the down count continued and a further frame is assembled into the store 19, if necessary (step 48). Processing then returns to step 44.

The construction of each frame will be conventional and include at least a destination address (end station port 4 in this case), a source address (end station port 2) and other information required by the communication protocol.

Although the counter 21 has been described as a down counter, it could equally well be an up counter. The advantage of a down counter is that the current count value C can be directly compared with zero. In other words, if the remaining count value C is less than 0 this indicates that there is insufficient time available to transmit a maximum size frame.

I claim:

1. An end station port for connection to a token passing communication system which operates under a communication protocol and which connects a number of end station ports and in which said communications protocol under which the system operates permits more than one data frame to be transmitted by an end station within a predetermined token holding time comprises a frame assembly system for preparing a data frame, having a length not exceeding a predetermined maximum size, for transmission; a control system for controlling the passage of data to and from said end station port for transmission on to and receipt from said communication system, wherein said control system causes a frame prepared by said frame assembly system to be transmitted when the token is held by said end station port, and wherein said control system includes a monitor for determining whether, following transmission of a current frame, there is sufficient time remaining to transmit another frame of said predetermined maximum size before said predetermined token holding time has expired.

2. An end station port according to claim 1, wherein said frame assembly system includes a store for storing a complete data frame prior to transmission.

3. An end station port according to claim 1, wherein said monitor includes a counter which is incremented or decremented at regular intervals to monitor the time to transmit a data frame, and a comparator for comparing the time remaining until completion of the current predetermined token holding time and the time to transmit a frame of the predetermined maximum size.

4. An end station port according to claim 3, wherein said counter comprises a down counter.

5. An end station port according to claim 4, wherein said down counter commences its count from a value equal to the difference between said predetermined token holding time and the time for completing the transmission of a data frame of predetermined maximum size.

6. An end station port according to claim 3, wherein said counter counts bytes transmitted on to the communication system.

7. An end station port according to claim 1, wherein said maximum frame size is 4K bytes.

8. An end station port according to claim 1, wherein said predetermined token holding time is equal to the time to transmit substantially 18K bytes on to the communication system.

9. A token passing communication system operating under a communications protocol and connecting a number of end station ports, and in which said communications protocol under which the system operates permits more than one data frame to be transmitted by an end station port within a predetermined token holding time, and wherein each end station port comprises a frame assembly system for preparing a data frame, having a length not exceeding a predetermined maximum size, for transmission; a control system for controlling the passage of data to and from said end station port for transmission onto and receipt from said communication system, wherein said control system causes a frame prepared by said frame assembly system to be transmitted when the token is held by said end station port, and wherein said control system includes a monitor for determining whether, following transmission f a current frame, there is sufficient time remaining to transmit another frame of said predetermined maximum size before said predetermined token holding time has expired.

10. A system according to claim 9, wherein each end station port is associated with its own frame assembly system.

11. A system according to claim 9 in the form of a ring.

12. A system according to claim 9, wherein the communication system comprises a local area network.

* * * * *